(12) United States Patent
Lin et al.

(10) Patent No.: US 8,646,152 B2
(45) Date of Patent: Feb. 11, 2014

(54) TRANSVERSELY MOVABLE HINGE AND FOLDING DEVICE UTILIZING THE SAME

(75) Inventors: Zheng-Cheng Lin, New Taipei (TW); Ching-Hsiang Hsu, New Taipei (TW)

(73) Assignee: Shin Zu Shing Co., Ltd., New Tapei (TW)

( * ) Notice: Subject to any disclaimer, the term of this patent is extended or adjusted under 35 U.S.C. 154(b) by 268 days.

(21) Appl. No.: 13/110,233

(22) Filed: May 18, 2011

(65) Prior Publication Data

US 2012/0291573 A1    Nov. 22, 2012

(51) Int. Cl.
*E05D 11/10*    (2006.01)

(52) U.S. Cl.
USPC ......................................................... 16/330

(58) Field of Classification Search
USPC ........... 16/303, 330, 337–339, 342, 360, 361, 16/367, 362; 361/679.08, 679.11, 679.02, 361/679.15, 679.27; 455/90.3, 575.1, 455/575.3, 575.8; 379/433.12, 433.13; 348/373, 333.01, 333.06, 794
See application file for complete search history.

(56) References Cited

U.S. PATENT DOCUMENTS

| | | | |
|---|---|---|---|
| 6,532,146 B1 | 3/2003 | Duquette | |
| 6,757,940 B2 * | 7/2004 | Lu et al. | 16/330 |
| 7,100,240 B2 * | 9/2006 | Amano | 16/303 |
| 7,607,200 B2 * | 10/2009 | Chang | 16/303 |
| 7,620,425 B2 | 11/2009 | Ju | |
| 7,633,744 B2 | 12/2009 | Kuhn | |
| 7,936,559 B2 * | 5/2011 | Chen | 361/679.27 |
| 8,082,628 B2 * | 12/2011 | Chiang | 16/361 |
| 2006/0005356 A1 * | 1/2006 | Amano et al. | 16/341 |
| 2006/0112516 A1 | 6/2006 | Chen | |
| 2007/0094842 A1 * | 5/2007 | Chang | 16/330 |
| 2010/0050382 A1 * | 3/2010 | Zhang et al. | 16/297 |
| 2010/0251518 A1 | 10/2010 | Chiang | |
| 2010/0275412 A1 * | 11/2010 | Wang et al. | 16/297 |
| 2011/0088219 A1 * | 4/2011 | Huang et al. | 16/319 |

FOREIGN PATENT DOCUMENTS

JP    2004138184 A  *  5/2004
JP    2004183698 A  *  7/2004

* cited by examiner

*Primary Examiner* — Chuck Mah
(74) *Attorney, Agent, or Firm* — Alan Kamrath; Kamrath IP Lawfirm, P.A.

(57) ABSTRACT

A transversely movable hinge is mounted between a base and a cover of a folding device and has a moving assembly. The moving assembly is connected to an expansion device via a linking rod. Therefore, when the folding device is opened, the expansion device is driven to extend and is convenient for users. When the folding device is closed, the expansion device is driven to retract for saving space.

7 Claims, 13 Drawing Sheets

TRANSVERSELY MOVABLE HINGE AND FOLDING DEVICE UTILIZING THE SAME

BACKGROUND OF THE INVENTION

1. Field of the Invention

The present invention relates to a hinge and, especially, to a hinge for a folding device. When the folding device is opened or closed, the hinge can move components transversely at the same time.

2. Description of the Prior Arts

A folding device, such as a notebook computer or a cell phone, generally includes a base, a cover and a hinge. The hinge connects the base and the cover to allow the cover to rotate relative to the base for saving space and enhancing portability.

U.S. Pat. Nos. 7,633,744; 6,532,146; and 7,620,425 disclose a conventional folding device having a plurality of foldable displays. The displays can be functioned as an output or/and input interface, and it has been widely used for years. However, the foldable displays increase functions but must be opened by a user's hand after the folding device is opened, so they are inconvenient to use.

Moreover, U.S. Patent Publication No. 2010/0251518 discloses another conventional folding device having a hinge that can move a cover transversely when the folding device is opened. However, the folding device disclosed in U.S. Patent Publication No. 2010/0251518 does not have any additional display or expansion device so cannot increase functions.

U.S. Patent Publication No. 2006/0112516 discloses another conventional folding device having a hinge assembly for joining a flip cover section to a body section of a foldable electronic device, and includes a shaft with a pin pushed by a spring to slide in the sliding slot of a sleeve as a way to open the folding device. However, this patent publication does not provide an additional display.

To overcome the shortcomings, the present invention provides a transversely movable hinge to mitigate or obviate the aforementioned problems.

SUMMARY OF THE INVENTION

The main objective of the present invention is to provide a transversely movable hinge having a main bracket and a moving assembly. The moving assembly is connected to the main bracket and has a rotating unit, a driving unit and a driven unit. The rotating unit is mounted rotatably on the main bracket. The driving unit is connected to the main bracket. The driven unit is connected to the rotating unit and abuts the driving unit. The rotating unit drives the driven unit to rotate synchronously. The driving unit drives the driven unit to move transversely. Therefore, when a folding device with the transversely movable hinge is opened, an expansion device can be driven to extend for convenient use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
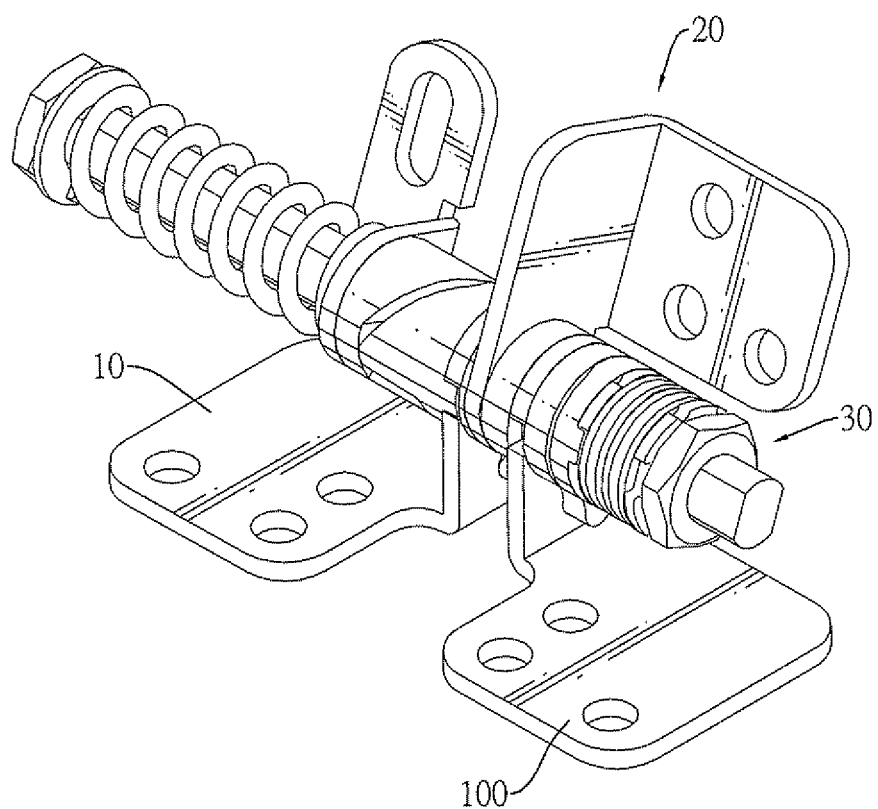
FIG. 1 is a perspective view of a transversely movable hinge in accordance with the present invention.
Figure 2:
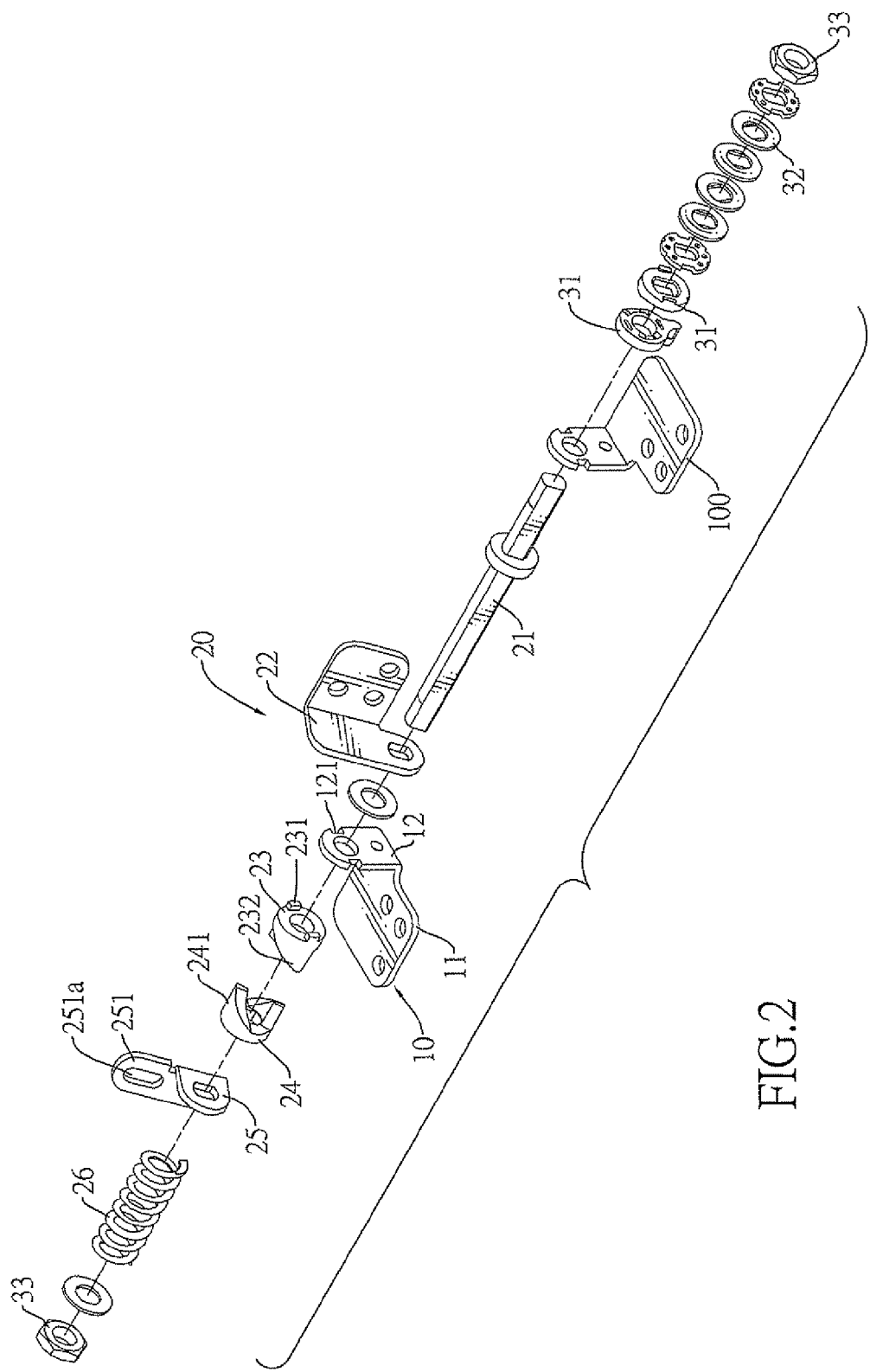
FIG. 2 is an exploded perspective view of the transversely movable hinge in FIG. 1.

With reference to FIGS. 1 and 2, a transversely movable hinge in accordance with the present invention comprises a main bracket 10, a moving assembly 20, a torsion assembly 30 and an auxiliary bracket 100.

The main bracket 10 has a mounting panel 11 and a connecting panel 12. The connecting panel 12 vertically protrudes from the mounting panel 11 and has two receiving recesses 121.

The moving assembly 20 is connected to the main bracket 10 and has a rotating unit, a driving unit and a driven unit. The rotating unit is mounted rotatably on the main bracket 10 and has a pintle 21 and a rotating bracket 22. The pintle 21 is mounted rotatably through the connecting panel 12 of the main bracket 10. The rotating bracket 22 is mounted securely around the pintle 21.

Figure 3:
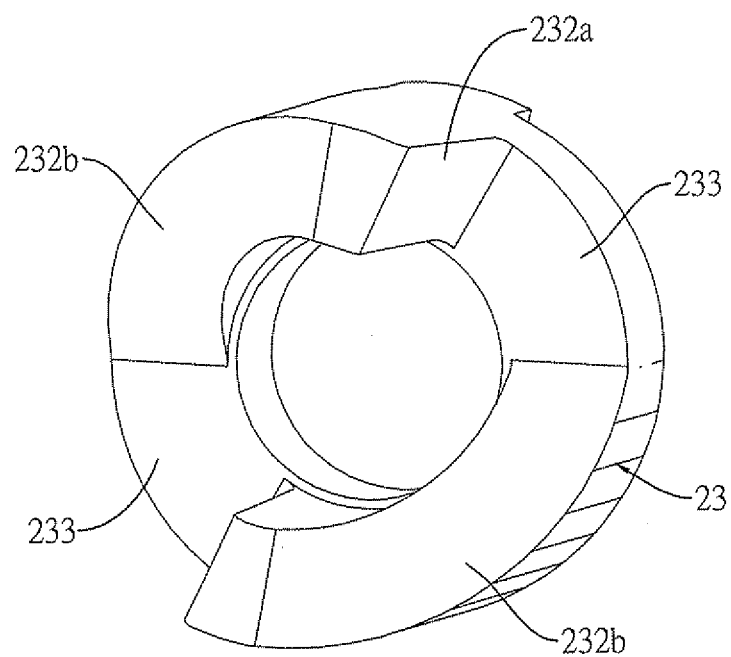
FIG. 3 is a perspective view of a driving wheel of the transversely movable hinge in FIG. 1.

The driving unit is connected to the main bracket 10 and has a driving wheel 23. The driving wheel 23 is mounted securely on the main bracket 10, is mounted around the pintle 21 and has two side surfaces, two clamping protrusions 231, two driving parts 232 and two driving gaps 233. The clamping protrusions 231 protrude from one of the side surfaces of the driving wheel 23 and engage the receiving recesses 121 of the main bracket 10 to mount the driving wheel 23 on the main bracket 10 securely. The driving parts 232 protrude respectively from the other side surface of the driving wheel 23. With further reference to FIG. 3, each driving part 232 has an inclined surface 232a connected to a curved surface 232b. Each driving gap 233 is defined between one inclined surface 232a of one of the driving parts 232 and one curved surface 232b of the other driving part 232.

Figure 4:
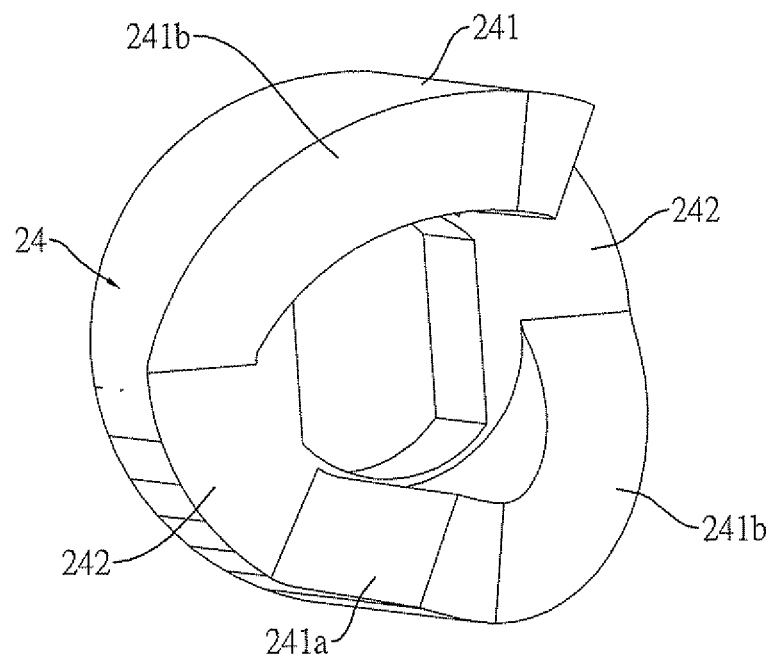
FIG. 4 is a perspective view of a driven wheel of the transversely movable hinge in FIG. 1.

The driven unit is connected to the rotating unit and abuts the driving unit. The rotating unit drives the driven unit to rotate synchronously. The driving unit drives the driven unit to move transversely. The driven unit has a driven wheel 24, a driven bracket 25 and a resilient element 26. The driven wheel 24 is mounted non-rotatably and axially movably around the pintle 21, abuts the driving wheel 23 and has a side surface, two driven parts 241 and two driven gaps 242. With further reference to FIG. 4, the driven parts 241 protrude respectively from the side surface of the driven wheel 24 and correspond to the driving gaps 233 of the driving wheel 23. Each driven part 241 has an inclined surface 241a connected to a curved surface 241b. Each driven gap 242 is defined between one inclined surface 241a of one of the driven parts 241 and one curved surface 241b of the other driven part 241. The driven bracket 25 is mounted non-rotatably and axially movably around the pintle 21, abuts the driven wheel 24 and has a connecting panel 251 having an elongated hole 251a. The resilient element 26 is mounted around the pintle 21 and abuts the driven bracket 25 so that the driven bracket 25 is located between the resilient element 26 and the driven wheel 24.

The torsion assembly 30 is connected to the moving assembly 20 and has two positioning wheels 31, multiple disk-shape springs 32 and two fastening nuts 33. The positioning wheels 31 are mounted around the pintle 21. One of the positioning wheels 31 has grooves, and the other positioning wheel 31 has protrusions corresponding to the grooves for providing a positioning effect. The disk-shape springs 32 are mounted around the pintle 21 and abut the positioning wheels 31 for providing torque force. The fastening nuts 33 are mounted securely on two ends of the pintle 21.

The auxiliary bracket 100 is mounted around the pintle 21 adjacent to the torsion assembly 30 so that the structure of the present invention is balanced.

Figure 5:
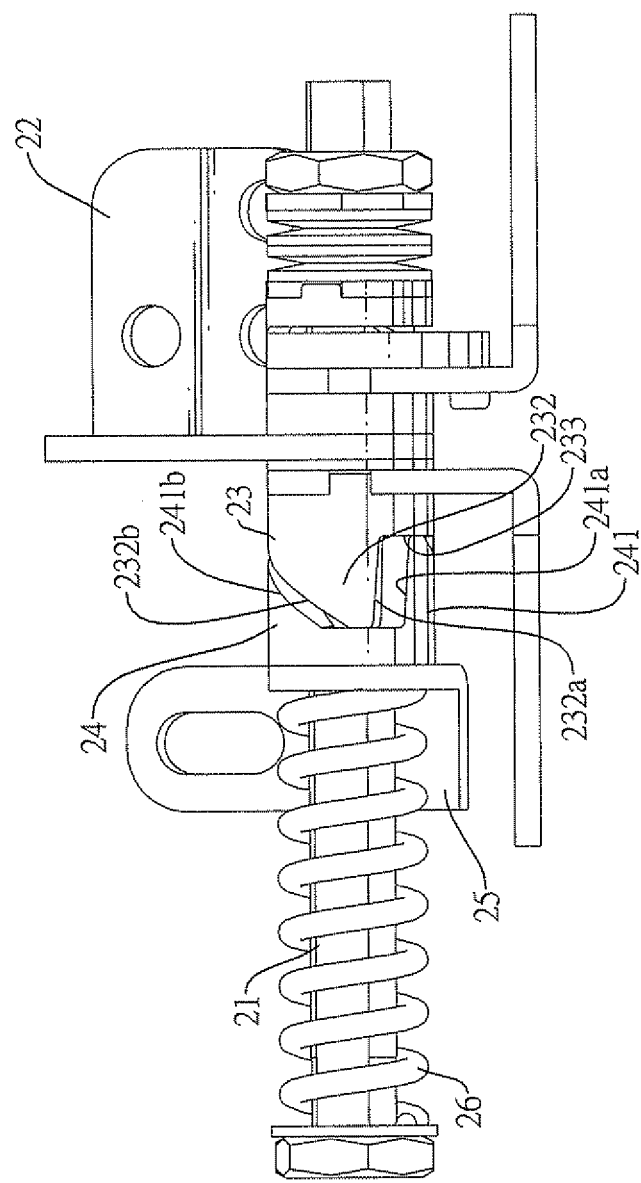
FIG. 5 is a side view of the transversely movable hinge in FIG. 1.
Figure 6:
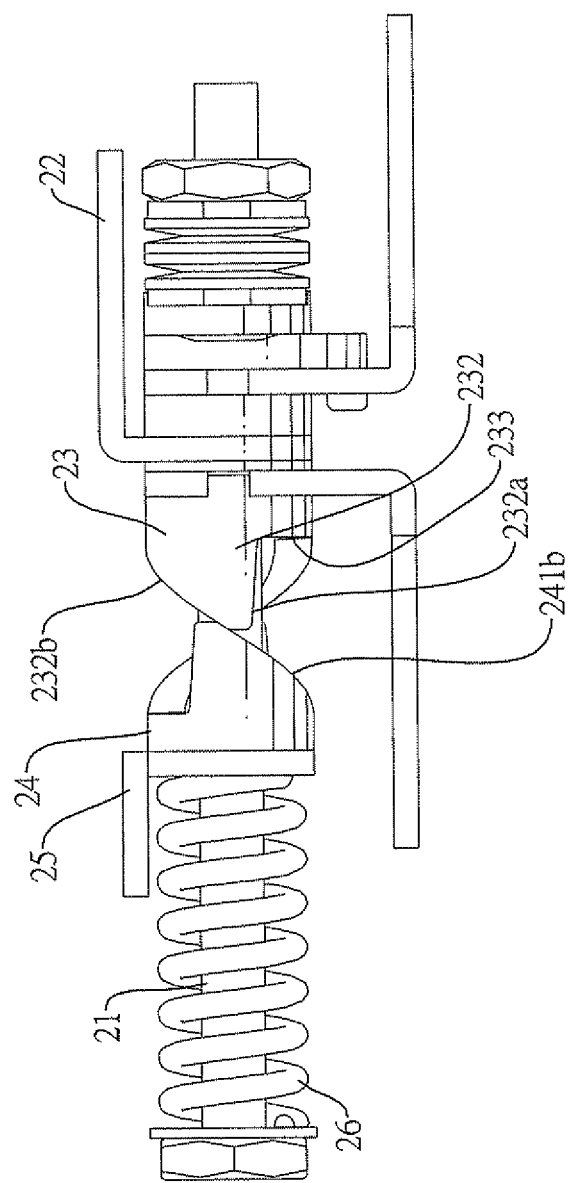
FIG. 6 is an operational side view of the transversely movable hinge in FIG. 1, showing a rotating unit and a driven unit rotating.

With reference to FIGS. 5 and 6, when the rotating bracket 22 rotates relative to the main bracket 10, the pintle 21 and the driven wheel 24 are driven to rotate synchronously. Because the inclined surfaces 241a and the curved surfaces 241b of the driven wheel 24 correspond to and abut the inclined surfaces 232a and the curved surfaces 232b of the driving wheel 23, when the rotating bracket 22 starts to rotate relative to the main bracket 10, the driven wheel 24 is also driven to move transversely to push the driven bracket 25 and the resilient element 26. Then, when the driven wheel 24 returns to an original position, the resilient element 26 releases its resilient force to the driven bracket 25 to its original position as well. Besides, the disk-shape springs 32 of the torsion assembly 30 force the positioning wheels 31 to rub against each other during rotation of the hinge for maintaining the rotating bracket 22 at a desired angle with respect to the main bracket 10.

Figure 7:
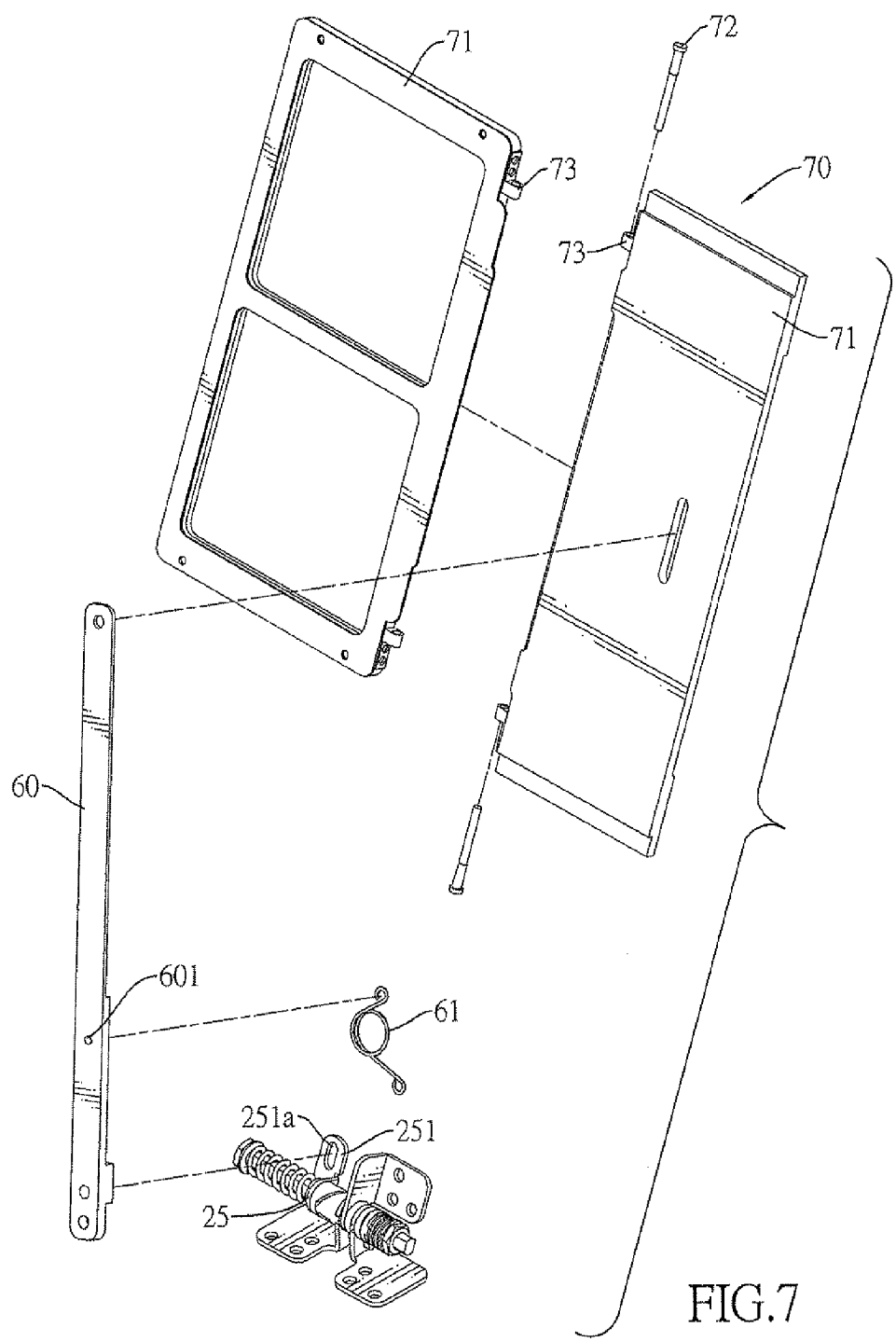
FIG. 7 is an exploded perspective view of the transversely movable hinge in FIG. 1 with a linking rod and an expansion device.
Figure 8:
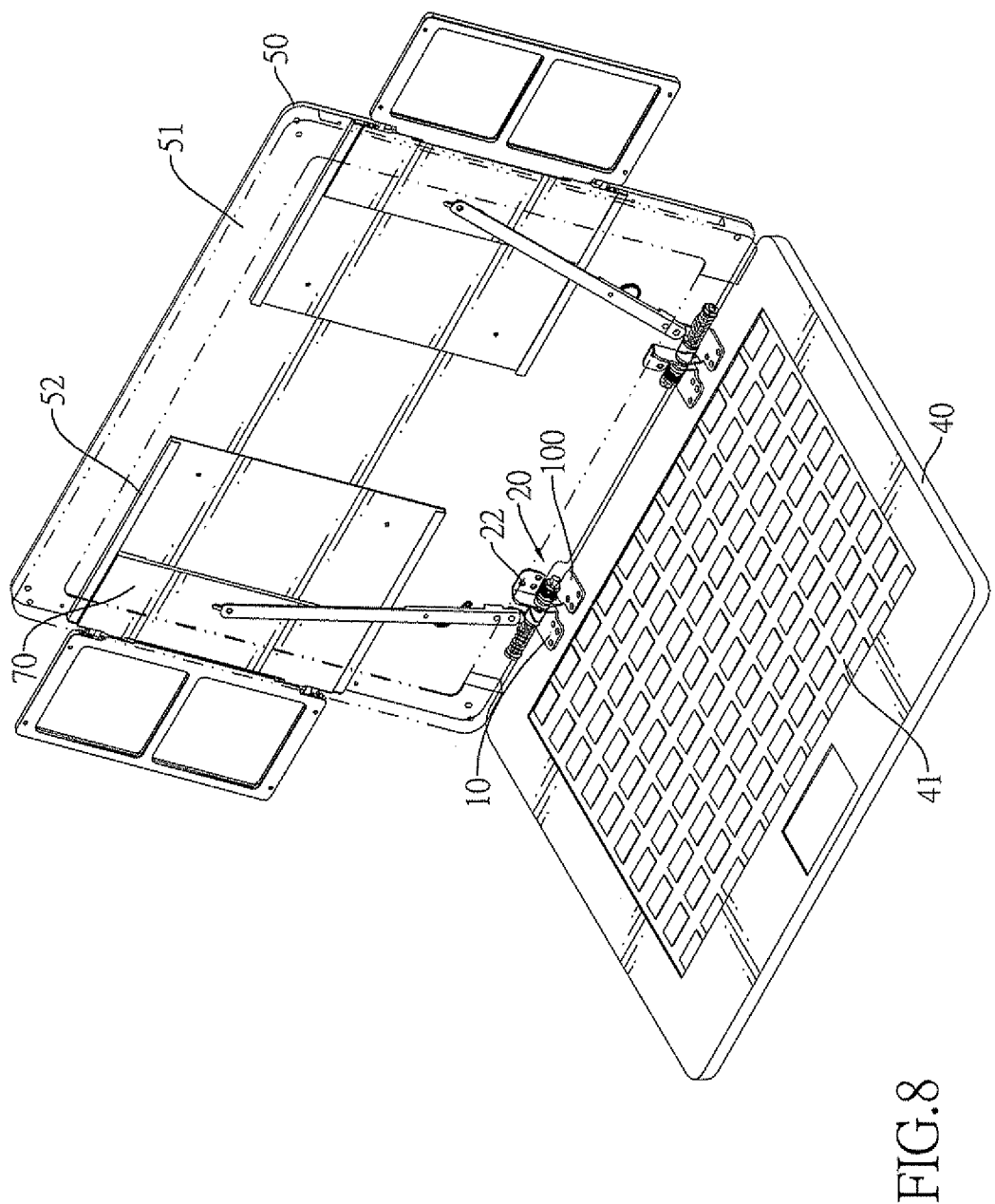
FIG. 8 is a perspective view of a folding device in accordance with the present invention, shown opened.

With reference to FIGS. 7 and 8, a folding device in accordance with the present invention comprises a base 40, a cover 50, at least one transversely movable hinge as described, at least one linking rod 60 and at least one expansion device 70.

The at least one hinge is mounted between the base 40 and the cover 50. The mounting panel 11 of the main bracket 10 and the auxiliary bracket 100 are mounted securely to the base 40. The moving assembly 20 is connected to the cover 50. The rotating bracket 22 of the moving assembly 20 is mounted securely to the cover 50.

In a preferred embodiment, the at least one linking rod 60 is mounted pivotally to the cover 50 at a fulcrum 601. Two ends of the at least one linking rod 60 are respectively connected to the at least one expansion device 70 and the moving assembly 20. Specifically, two ends of the at least one linking rod 60 are respectively and pivotally connected to the expansion device 70 and the driven bracket 25 (or the driven wheel 24) of the moving assembly 20. A pin is mounted through the elongated hole 251a of the driven bracket 25 of the moving assembly 20 and a corresponding end of the at least one linking rod 60. Two ends of a spring 61 are respectively connected to the cover 50 and the fulcrum 601 of the at least one linking rod 60. The spring 61 provides a resilient force to facilitate the expansion device 70 to extend out smoothly. The cover 50 has a main screen 51 covering the at least one linking rod 60 and the at least one expansion device 70. The cover 50 further has slide rails 52 to allow the at least one expansion device 70 to be slidably mounted within the cover 50.

Figure 12:
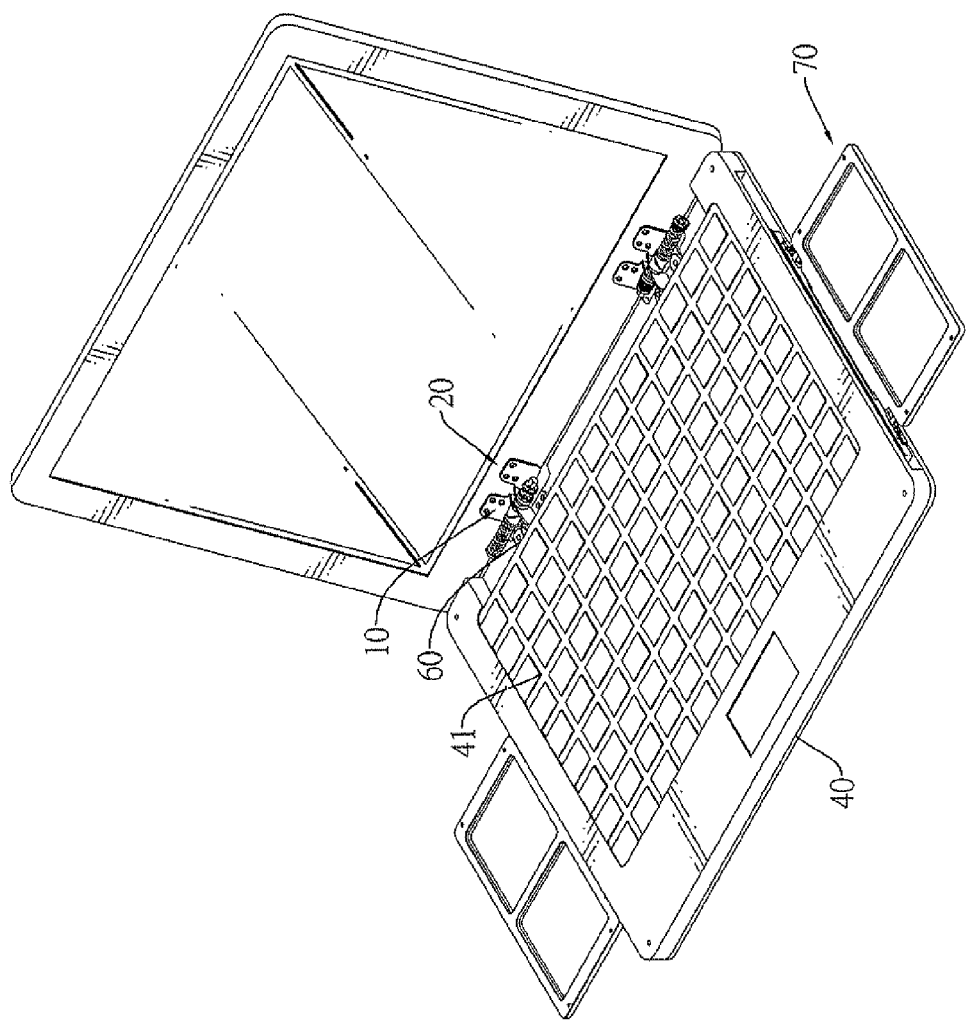
FIGS. 12 and 13 are perspective views of another embodiment of a folding device in accordance with the present invention, shown opened.
Figure 13:
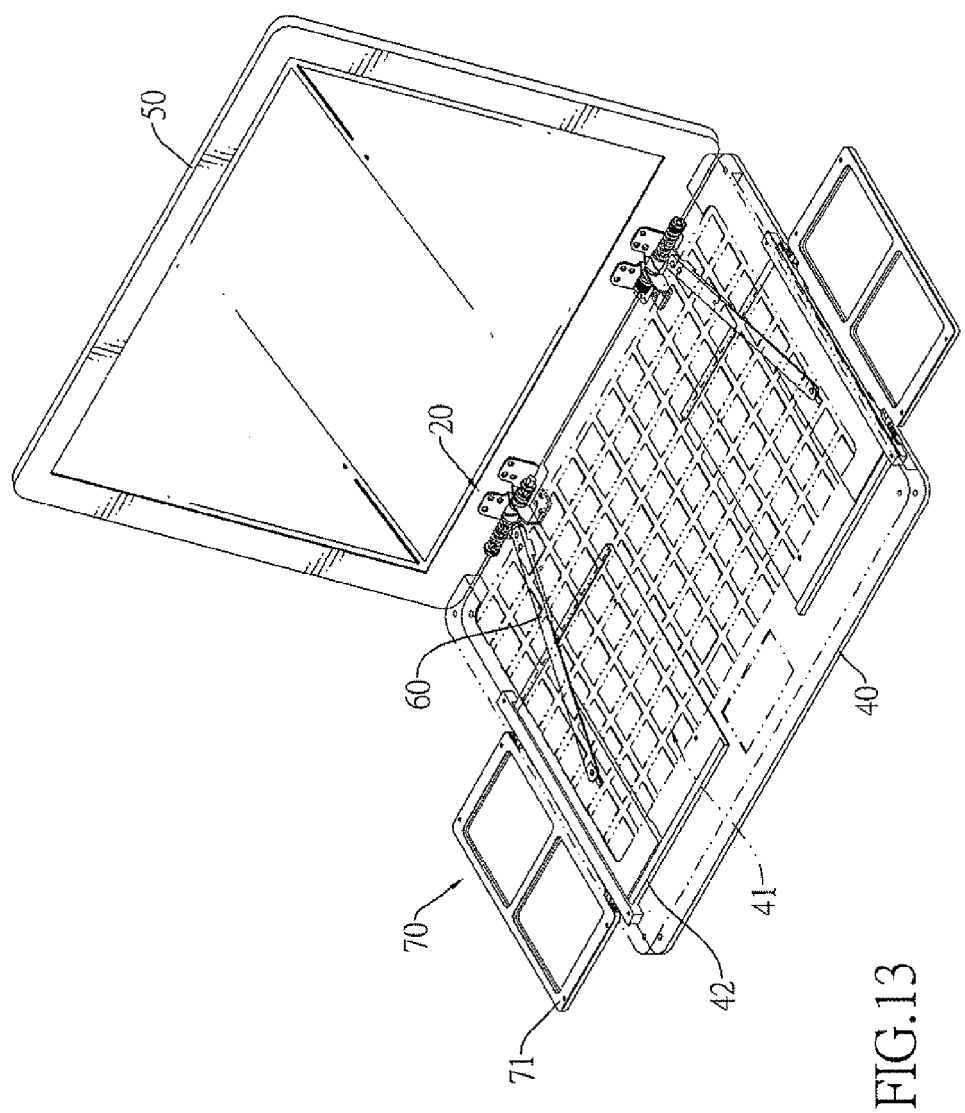

With reference to FIGS. 12 and 13, in another preferred embodiment, the at least one linking rod 60 is mounted pivotally to the base 40. Two ends of the at least one linking rod 60 are respectively connected to the at least one expansion device 70 and the moving assembly 20. The base 40 has a keyboard 41 covering the at least one linking rod 60 and the at least one expansion device 70. The base 40 further has slide rails 42 to allow the at least one expansion device 70 to be slidably mounted within the base 40.

With reference to FIG. 7, the at least one expansion device 70 has two panels 71 pivotally connected to each other by pivots 72 and sleeves 73. The at least one expansion device 70 may be an input device (e.g. an additional keyboard or a touch screen) or may be an output device (e.g. an additional screen or a speaker).

Figure 9:
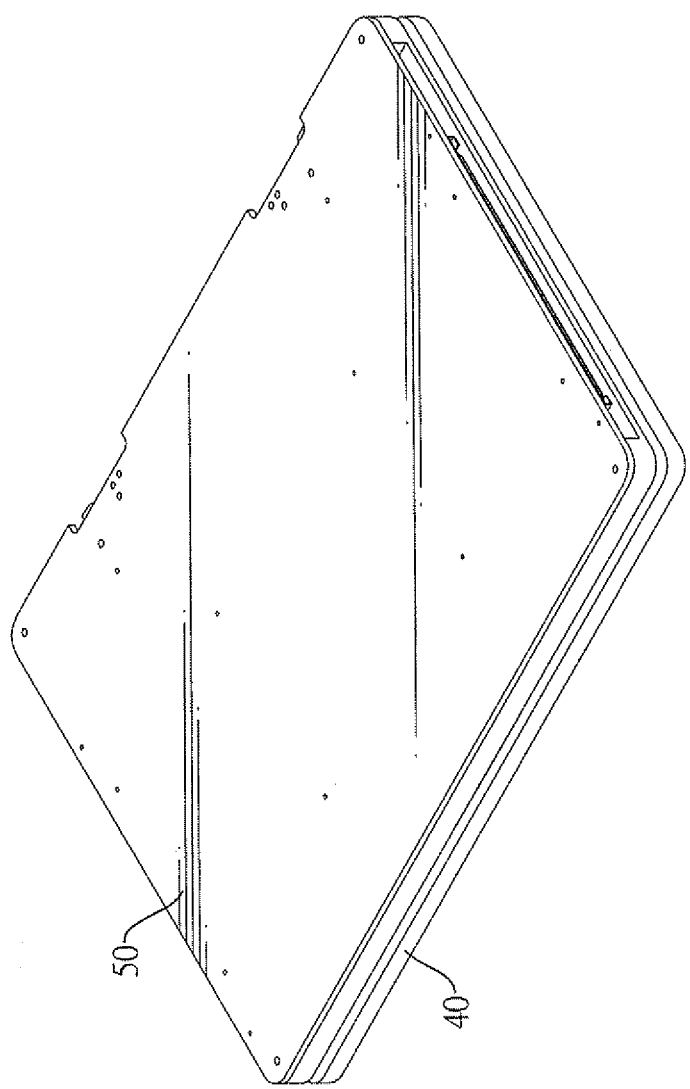
FIGS. 9 and 10 are perspective views of the folding device in FIG. 8, shown closed.
Figure 10:
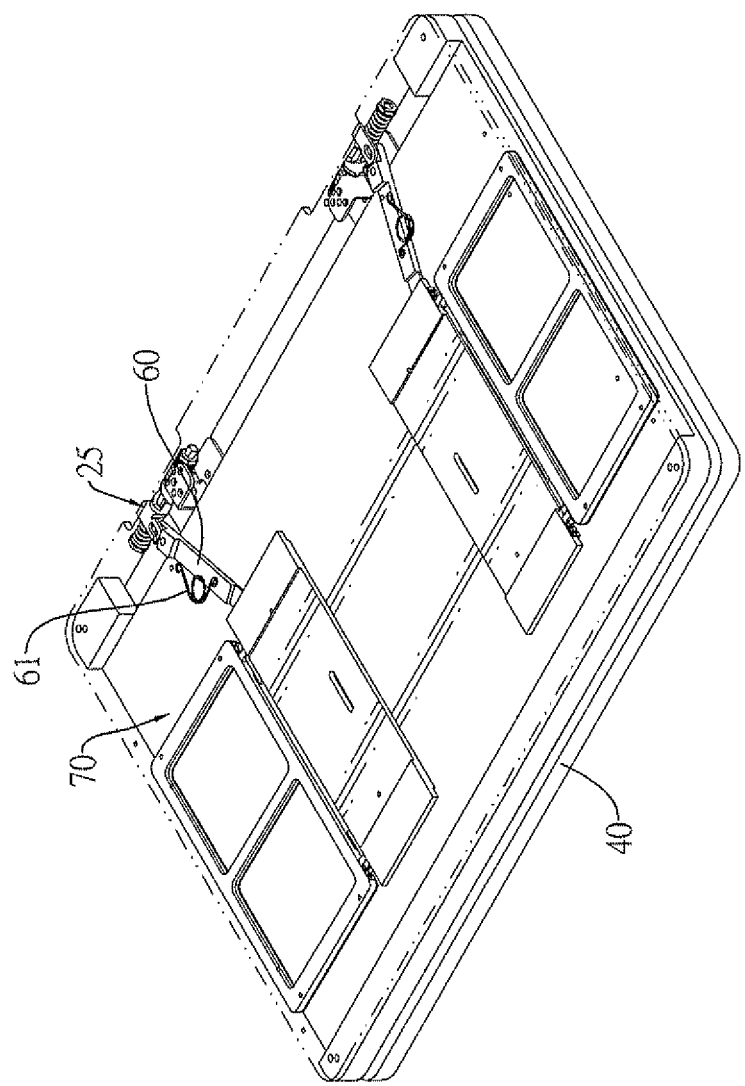

With reference to FIGS. 6, 9 and 10, when the cover 50 is closed relative to the base 40, the driven parts 241 of the driven wheel 24 engage the driving gaps 233 of the driving wheel 23, and the at least one expansion device 70 is received within the cover 50. The at least one expansion device 70 retracted within the cover 50 saves space, so the folding device is convenient to carry and store due to its small volume.

Figure 11:
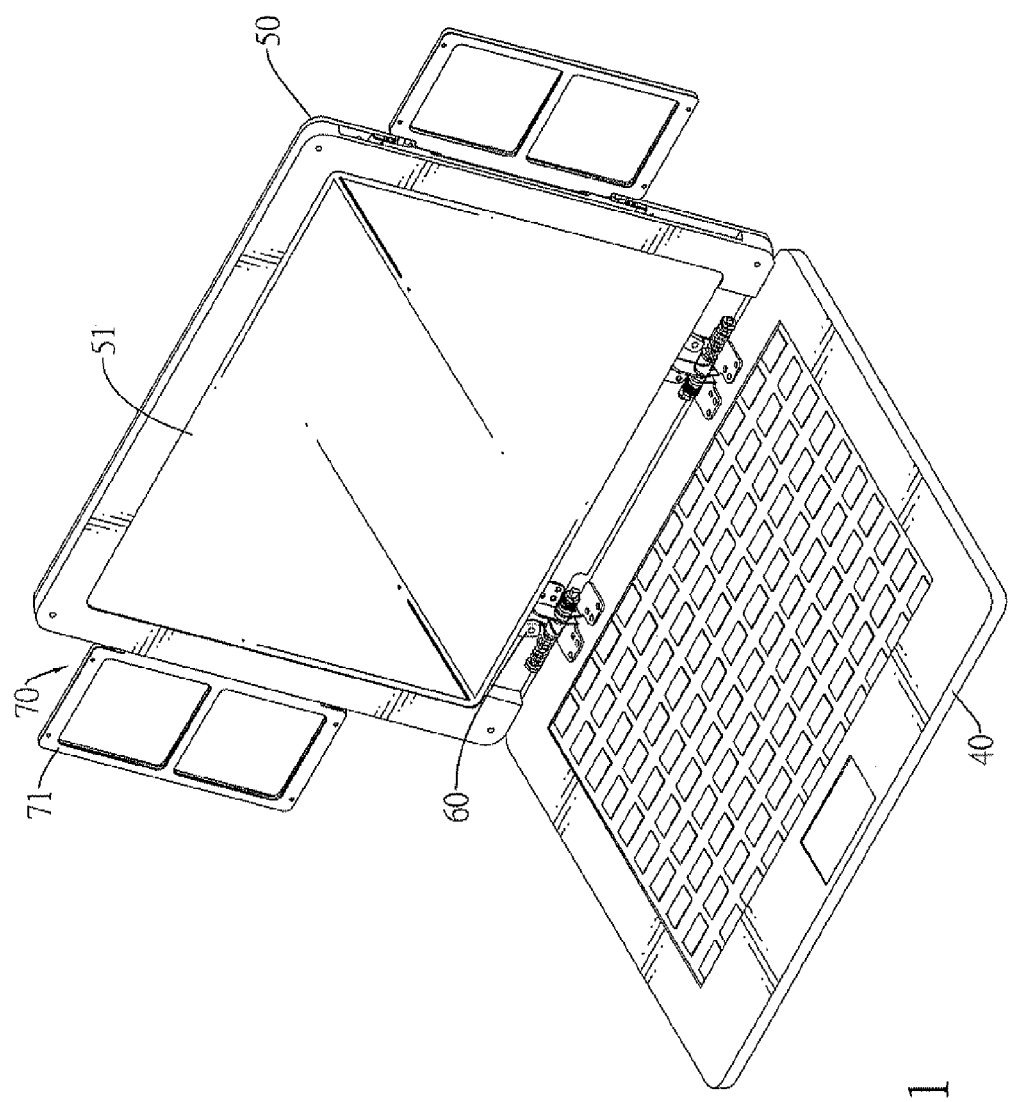
FIG. 11 is a perspective view of the folding device in FIG. 8, shown opened.

With reference to FIGS. 5, 8 and 11, when the cover 50 is opened relative to the base 40, the rotating bracket 22, the pintle 21 and the driven wheel 24 of the moving assembly 20 are driven to rotate, and the driven wheel 24 is also driven to move transversely. The moving driven wheel 24 drives the linking rod 60 to sway at the fulcrum 601, so the at least one expansion device 70 extends out of the cover 50, enabling convenient application of the present invention.

It should be noted that the present invention provides a hinge having a moving assembly 20 (i.e. the driven wheel 24 or the driven bracket 25) that can drive the linking rod 60 to sway at the fulcrum 601 to push the expansion device 70 out. However, there are various ways to drive one end of the linking rod 60 to achieve the same function as above. For example, the hinge device as disclosed in U.S. Patent Publication No. 2006/0112516 teaches one pin sliding in a sliding slot of a sleeve. It can be conceived that the pin is connected to one end of the linking rod 60 of the present invention to push the expansion device 70 out when the cover 50 is opened.

Another example disclosed in U.S. Patent Publication No. 2010/0251518 is the first connecting member can be linked to the linking rod 60 to push the expansion device 70 out. These two examples are easily combined into the present invention for those skilled in the art.

Even though numerous characteristics and advantages of the present invention have been set forth in the foregoing description, together with details of the structure and features of the invention, the disclosure is illustrative only. Changes may be made in the details, especially in matters of shape, size, and arrangement of parts, within the principles of the invention to the full extent indicated by the broad general meaning of the terms in which the appended claims are expressed.

What is claimed is:

1. A transversely movable hinge comprising:
a main bracket; and
a moving assembly connected to the main bracket and having
a rotating unit mounted rotatably on the main bracket;
a driving unit connected to the main bracket; and
a driven unit connected to the rotating unit and abutting the driving unit, wherein:

the rotating unit drives the driven unit to rotate synchronously;

the driving unit drives the driven unit;

the rotating unit has a pintle mounted rotatably through the main bracket;

the driving unit has a driving wheel mounted securely on the main bracket and mounted around the pintle of the rotating unit;

the driven unit has a driven wheel mounted non-rotatably and axially movably around the pintle and abutting the driving wheel of the driving unit;

the driving wheel of the driving unit has
- a side surface; and
- at least one driving part protruding from the side surface of the driving wheel;

each one of the at least one driving part has an inclined surface connected to a curved surface;

the driven wheel of the driven unit has
- a side surface facing the driving unit; and
- at least one driven part protruding from the side surface of the driven wheel;

each one of the at least one driven part has an inclined surface connected to a curved surface;

the driving wheel of the driving unit has two driving parts and two driving gaps, and each driving gap is defined between one inclined surface of one of the two driving parts and one curved surface of another of the two driving parts;

the driven wheel of the driven unit has two driven parts and two driven gaps, and each driven gap defined between one inclined surface of one of the two driven parts and one curved surface of another of the two driven parts;

the rotating unit has a rotating bracket mounted securely around the pintle; and the driven unit has a driven bracket mounted non-rotatably and axially movably around the pintle of the rotating unit and abutting the driven wheel.

2. The transversely movable hinge as claimed in claim 1, wherein the driven unit has a resilient element mounted around the pintle of the rotating unit with the driven bracket located between the resilient element and the driven wheel.

3. The transversely movable hinge as claimed in claim 2, wherein the driven bracket of the driven unit has a connecting panel.

4. The transversely movable hinge as claimed in claim 3, wherein the connecting panel of the driven bracket of the driven unit has an elongated hole.

5. The transversely movable hinge as claimed in claim 1 further comprising a torsion assembly connected to the moving assembly and an auxiliary bracket.

6. The transversely movable hinge as claimed in claim 1 further comprising a torsion assembly connected to the moving assembly and an auxiliary bracket and having
- two positioning wheels mounted around the pintle of the rotating unit, with one of the two positioning wheels having grooves and another of the two positioning wheels having protrusions corresponding to the grooves;
- multiple disk-shape springs mounted around the pintle of the rotating unit and abutting the two positioning wheels; and
- two fastening nuts mounted securely on two ends of the pintle of the rotating unit.

7. The transversely movable hinge as claimed in claim 6 wherein the auxiliary bracket is mounted around the pintle of the rotating unit adjacent to the torsion assembly.

\* \* \* \* \*